United States Patent [19]

Murao et al.

[11] Patent Number: 5,467,752
[45] Date of Patent: Nov. 21, 1995

[54] METHOD AND APPARATUS FOR CONTROLLING THE FUEL INJECTION/IGNITION TIMING OF INTERNAL COMBUSTION ENGINES, AND A CRANK ANGLE SENSOR USING SAME

[75] Inventors: Yoshinori Murao; Masami Nagano; Shigenori Hosowari, all of Katsuta, Japan

[73] Assignees: Hitachi, Ltd.; Hitachi Automotive Eng. Co., both of Japan

[21] Appl. No.: 115,717

[22] Filed: Sep. 3, 1993

[30] Foreign Application Priority Data

Sep. 4, 1992 [JP] Japan .................... 4-236810

[51] Int. Cl.⁶ .................................................. F02P 5/00
[52] U.S. Cl. .................... 123/414; 123/417; 364/431.03
[58] Field of Search .................... 123/414, 419, 123/417, 418; 364/431.03, 431.04

[56] References Cited

U.S. PATENT DOCUMENTS

| | | | |
|---|---|---|---|
| 4,961,410 | 10/1990 | Matsumura et al. | 123/414 |
| 5,047,943 | 9/1991 | Takahata et al. | 123/414 |
| 5,052,358 | 10/1991 | Fukui | 123/414 |
| 5,054,447 | 10/1991 | Fukui et al. | 123/419 |
| 5,056,485 | 10/1991 | Kobayashi et al. | 123/414 |
| 5,074,275 | 12/1991 | Fukui | 123/414 |
| 5,291,409 | 3/1994 | Richardson et al. | 123/419 |
| 5,325,833 | 7/1994 | Fukui et al. | 123/414 |

FOREIGN PATENT DOCUMENTS

| | | |
|---|---|---|
| 83452 | 3/1990 | Japan . |
| 140463 | 5/1990 | Japan . |

Primary Examiner—Thomas N. Moulis
Attorney, Agent, or Firm—Evenson, McKeown, Edwards & Lenahan

[57] ABSTRACT

An ignition timing controller for an automobile in which at least two reference ignition point signals are established for each cylinder, and the ignition timing is set according to the reference ignition point signal that is closer to the target ignition timing.

20 Claims, 13 Drawing Sheets

$$ADVT = \frac{(CRSET - ADV)}{110°} \times TREFL$$

IGNITION TIMING

FIG. 13

TIMING LOOKUP TABLE

MAPADV (DEG) (IGNITION SPARK ADVANCE VALUES)

| ADVN (ENGINE RPM) | 600 | 800 | 1200 | 1600 | 2000 |
|---|---|---|---|---|---|
| 5.25 | 0 | 3 | 4 | 9 | 12 |
| 5 | 0 | 3 | 4 | 9 | 12 |
| 4.75 | 0 | 3 | 4 | 9 | 12 |
| 4.5 | 0 | 3 | 4 | 9 | 12 |
| 4.25 | 0 | 3 | 6 | 10 | 16 |
| 4 | 0 | 5 | 7 | 11 | 17 |
| 3.75 | 3 | 8 | 11 | 16 | 18 |
| 3.5 | 4 | 9 | 12 | 17 | 19 |
| 3.25 | 5 | 9 | 12 | 17 | 22 |
| 3 | 6 | 10 | 14 | 20 | 26 |
| 2.5 | 9 | 14 | 19 | 24 | 29 |
| 2.25 | 12 | 17 | 22 | 26 | 31 |
| 2 | 13 | 18 | 23 | 28 | 33 |
| 1.75 | 11 | 15 | 20 | 24 | 29 |
| 1.5 | 10 | 10 | 15 | 20 | 25 |
| 1 | 10 | 10 | 12 | 15 | 20 |

TADVP (FUEL INJECTION PULSE WIDTH) (MSEC)

METHOD AND APPARATUS FOR CONTROLLING THE FUEL INJECTION/IGNITION TIMING OF INTERNAL COMBUSTION ENGINES, AND A CRANK ANGLE SENSOR USING SAME

BACKGROUND OF THE INVENTION

This invention relates to an ignition timing control method and apparatus for internal combustion engines, especially to a so-called "time control system" ignition timing control method and apparatus. In such controls, the ignition spark advance is determined (in angular measure, expressed in degrees) from the operating status of the engine and used to calculate a time, which is measured from a cylinder reference point determined for each cylinder to establish a measurement ending point at which ignition occurs (the "ignition point").

In the time control system internal combustion engine ignition timing controller described in Japanese Patent Laid-Open No. 83452/1990 and No. 140463/1990, for example, a crank angle sensor generates a pulse whose leading edge is a predetermined distance before top of dead center (B.T.D.C.). At this point a spark advance value is determined based on engine speed, and a time period which corresponds to the spark advance value is calculated and measured from the leading edge of the pulse in order to locate the ignition point. In such an arrangement, however, if the engine speed changes after measurement is started at the leading edge of the pulse, the ignition timing is also changed, and the time of the power supply to the ignition coil becomes too long or too short.

The same problem also arises in connection with fuel injection control, since the same sensor output pulses are used.

The purpose of this invention, therefore, is to reduce the error that is caused by engine speed changes in engine timing control devices such as described above. The control method and apparatus according to the invention can also be applied to fuel injection controllers.

Another purpose of this invention is to supply a sensor which may be used with such a control method and apparatus.

SUMMARY OF THE INVENTION

In the ignition timing control arrangement according to the invention, two or more time measurement starting points may be set before each cylinder top of dead center, and the measurement starting point is selected (based on the engine's operation status) to minimize the error in the engine ignition timing. Since the time between the selected measurement starting point (reference point) and the ignition point may not always be sufficient to store energy in the ignition coil, in such case the top priority is given to the power supply time (TDWELL). (That is, the spark is delayed for a period sufficient to allow time to develop the energy necessary to assure proper cylinder firing.) In this manner cylinder misfiring due to insufficient energy can be eliminated.

When engine speed is increased, in the control system according to the invention the required measurement starting point set closer to the top dead center is moved in the direction of the spark advance, from the set power supply starting point, and a new measurement starting point is used as the power supply starting point to supply power earlier. The ignition signal is then generated after the set power supply time. In addition, when engine speed is increased abruptly, the power supply starting point can also be moved in order to suppress the unnecessary occurrence of a delay angle.

The sensor used according to the invention has a disk that has slits from which more than two reference signals are generated for each cylinder, and a photoelectric pickup is used to detect the slits so that two or more reference points can be output. Such a sensor can be obtained by a simple modification of an existing sensor; for example, by increasing the number of slits or by utilizing both the leading edge and the trailing edge of the reference signal as a reference point.

Because this invention selects the measurement starting point closer to the top dead center when the spark advance value is closer to the top dead center, the time between the start and the end of measurement is shortened, and hence intervening changes of engine speed are reduced. As a result, the method and apparatus according to the invention can control the ignition timing of an internal combustion engine with reduced errors.

In addition, the same timing control method and apparatus according to the invention can be used to control fuel injection systems, assuming the same fuel injection starting point as for ignition timing. In fuel injection control according to the invention, the injection starting point is less influenced by changes of the engine rotation, so fuel injection will never be made at an improper timing of the air suction process. The fuel injection can also be controlled in sync with the timing to open/close the air suction valve.

Other objects, advantages and novel features of the present invention will become apparent from the following detailed description of the invention when considered in conjunction with the accompanying drawings.

BRIEF DESCRIPTION OF THE DRAWINGS

FIG. 13 shows an ignition control look up table;

DETAILED DESCRIPTION OF THE DRAWINGS

Figure 2:
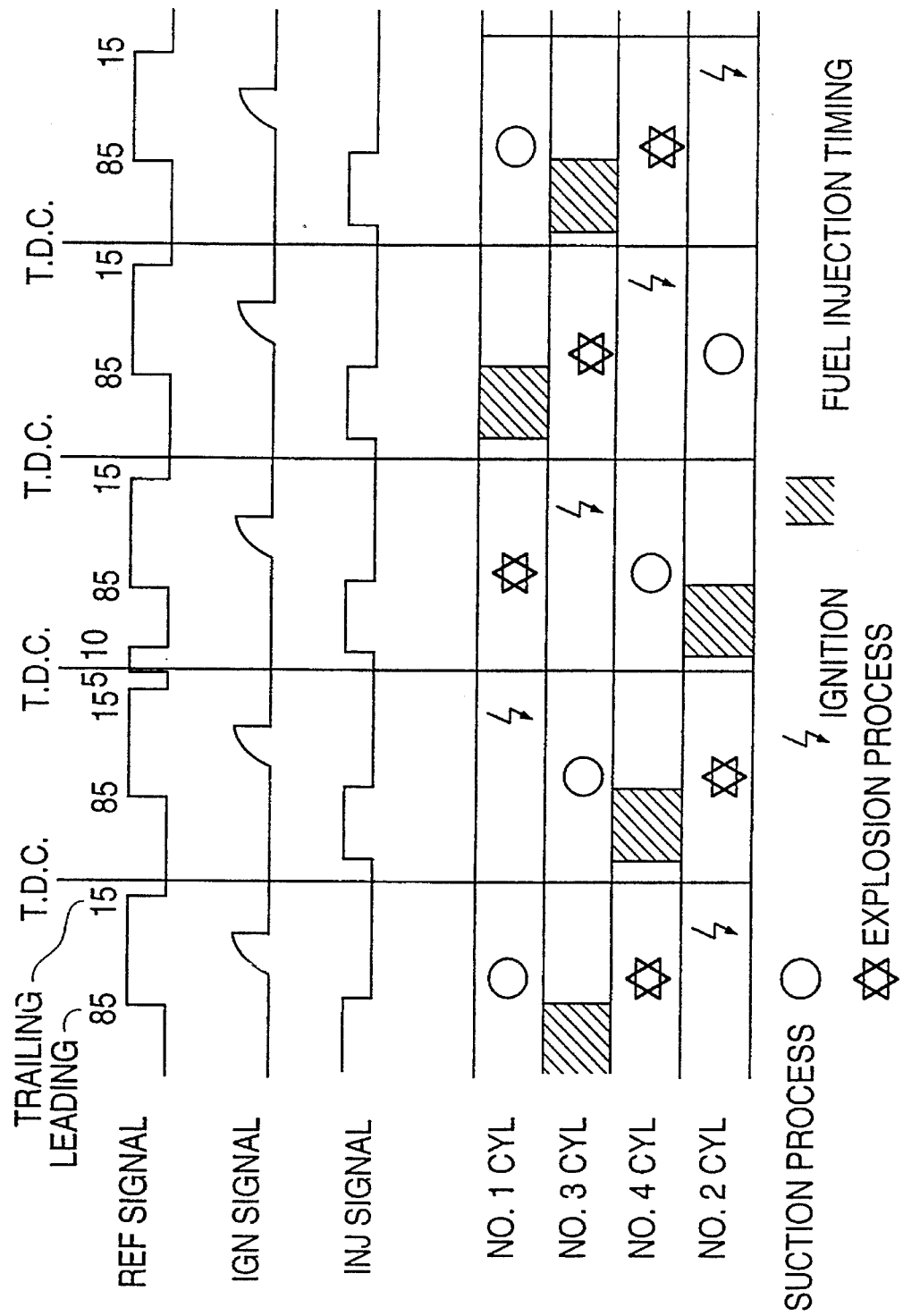
Figure 3:
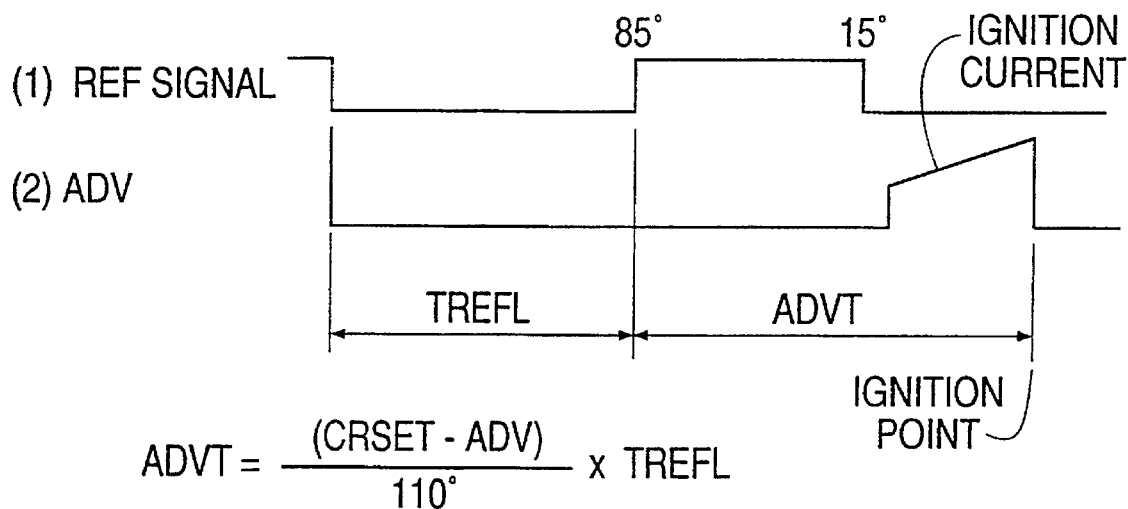
Figure 4:
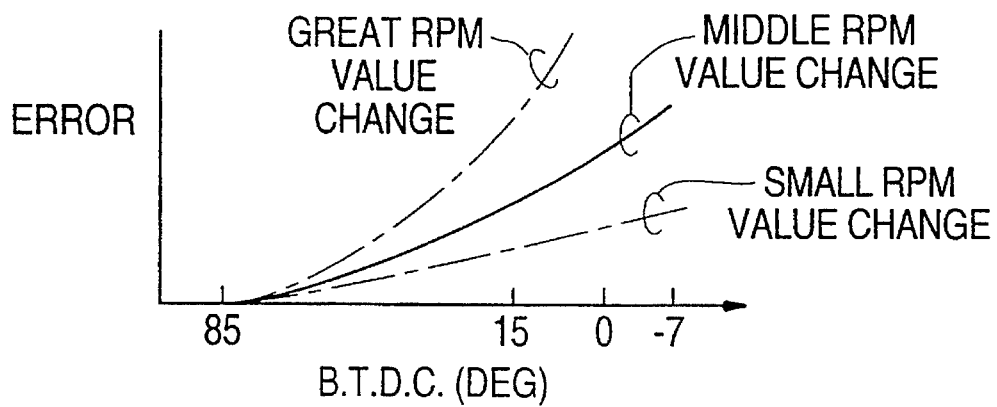
Figure 5:
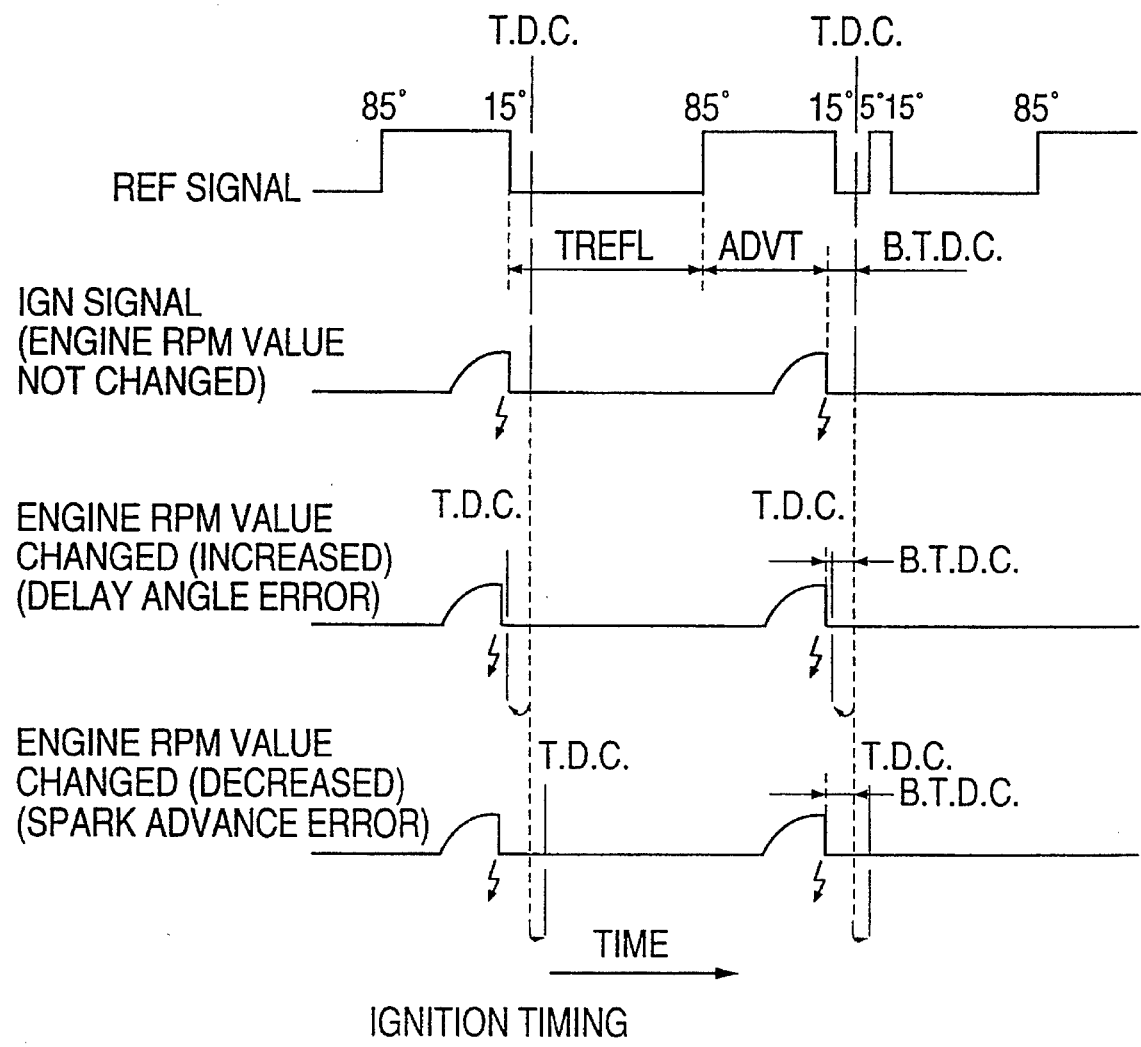

FIG. 2 shows the timing of the REF signal, fuel injection, and ignition in relation to the operating cycle of a conventional four cylinder engine. The REF signal comprises five square pulses generated during each cycle of operation: one pulse for each of the four cylinders (from which a B.T.D.C. 85° leading signal and a B.T.D.C. 15° trailing signal can be derived), and a cylinder identification pulse (which defines a B.T.D.C. 5° leading signal and an A.T.D.C.10° trailing signal used to identify a particular one of the four cylinders). (As used herein, the terms "leading" and "trailing" refer to the leading and trailing edges of the square wave pulses in the reference signal.) FIG. 3 through 5 show the troubles that can occur when setting ignition timing using such a REF signal.

FIG. 3 shows a set ignition timing. The ignition timing ADVT (the time in msec between the reference point CRSET—85° in this illustrative example—and the ignition point) is calculated with the following expression using the Low portion of the REF signal TREFL (which is 110°) and CRSET (85°) in the system depicted.

$$ADVT = \frac{(CRSET - ADV)}{110°} \cdot TREFL \qquad \text{[Expression 1]}$$

In prior art timing devices of this type, the calculated ADVT is always fixed by reference to the leading signal 85° as shown in FIG. 3. When the engine speed is stable, therefore, the required ignition timing is obtained, but when the speed changes, an error occurs between the set ignition timing and the actual ignition timing. (See FIG. 4.) FIG. 5 shows the error of the ignition timing when the engine speed increases and when the engine speed decreases. When the engine speed increases, it is greater at the actual ignition than at the time when the calculated ignition point was determined. Thus, TDC comes earlier; however, since the actual ignition point occurs at a calculated time after the reference point, ignition is delayed relative to TDC. (That is, it occurs later than the calculated ignition point, relative to TDC.) On the other hand, when the engine speed decreases, TDC comes later. Thus, the error occurs on the spark advance side. FIG. 4 shows this error. The farther the ignition point is away from 85°, which is the set reference point, the larger the error becomes; and the larger the error becomes, the more the engine speed changes. This invention increases the accuracy of engine timing by limiting the time period between the reference point and the ignition point.

Figure 6:
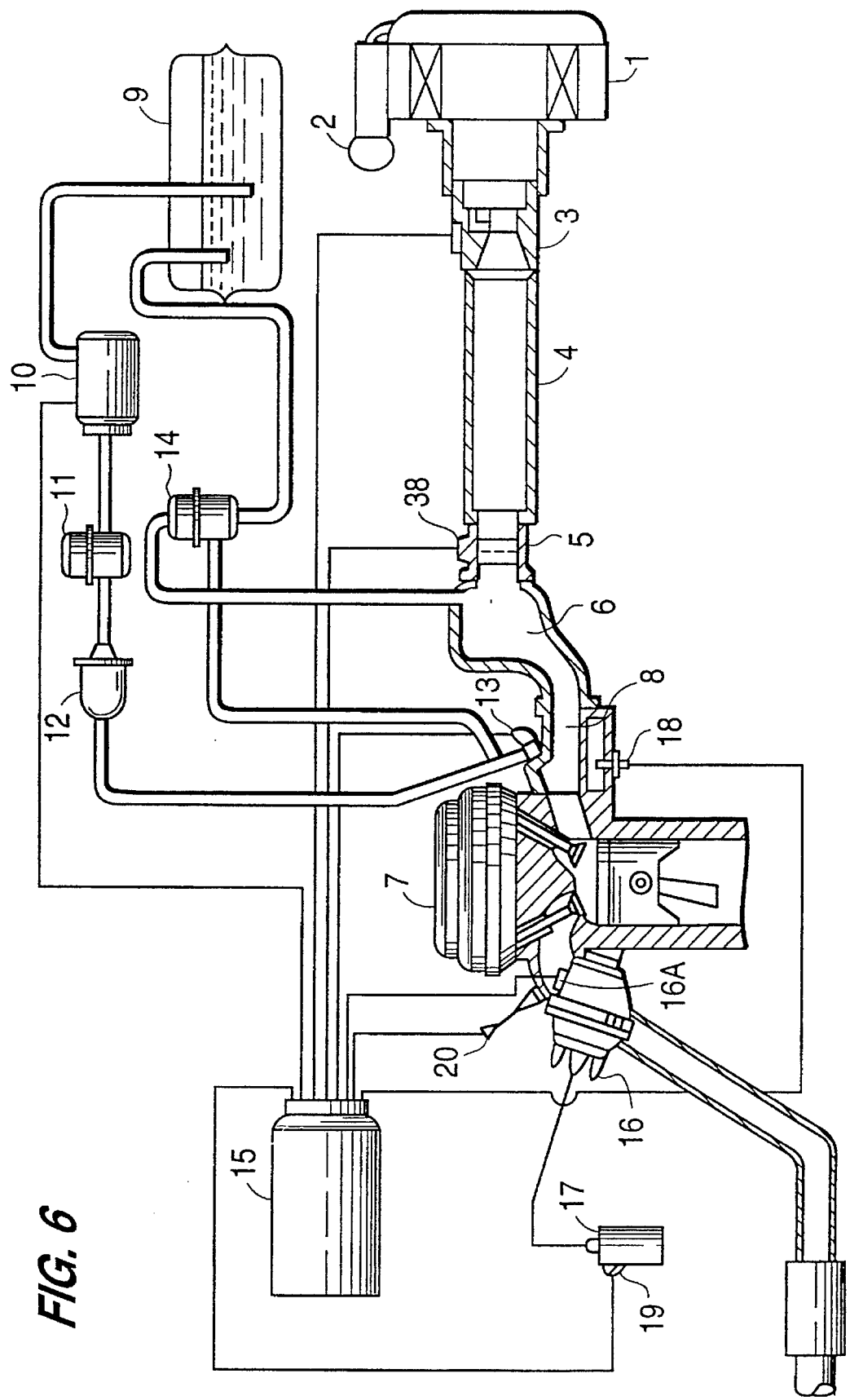
FIG. 6 is an example of an engine system configuration.

FIG. 6 shows an example of an engine system embodying this invention. Air is sucked into the engine from the inlet 2 of the air cleaner 1. The air then flows into the collector through hot-wire air flow meter 3 used to detect air flow, a duct 4, and a throttle valve body 5 which houses a throttle valve. From there, the air is distributed to suction pipes 8 connected to each cylinder of the engine 7, and fed into the cylinders. Fuel, such as gasoline, is sucked from the fuel tank 9 and pressurized by the fuel pump 10, then supplied to the fuel damper 11, the fuel filter 12 the injector 13, and the fuel system which contains the fuel pressure regulator 14. The fuel pressure is kept constant by the fuel pressure regulator, and the pressurized fuel is injected into the suction pipe 8 of each cylinder.

A suction flow signal is output from the air flow meter 3 to the control unit 15. The throttle sensor 38 senses the opening of the throttle valve body and also outputs a signal to the control unit 15. Similarly, a water temperature sensor 18 mounted in the engine body 7 is used to sense the temperature of the engine, which information is likewise entered to the control unit 15. Distributor 16 has a crank angle sensor 16A which outputs the reference angle signal REF (FIGS. 2, 3 and 5) indicating the rotation point of the crank shaft, which is also entered to the control unit 15. An $O_2$ sensor 20 mounted in an exhaust pipe senses whether the air-fuel ratio is higher or lower than a calculated air-fuel ratio, and outputs a signal to the control unit 15.

Figure 9:
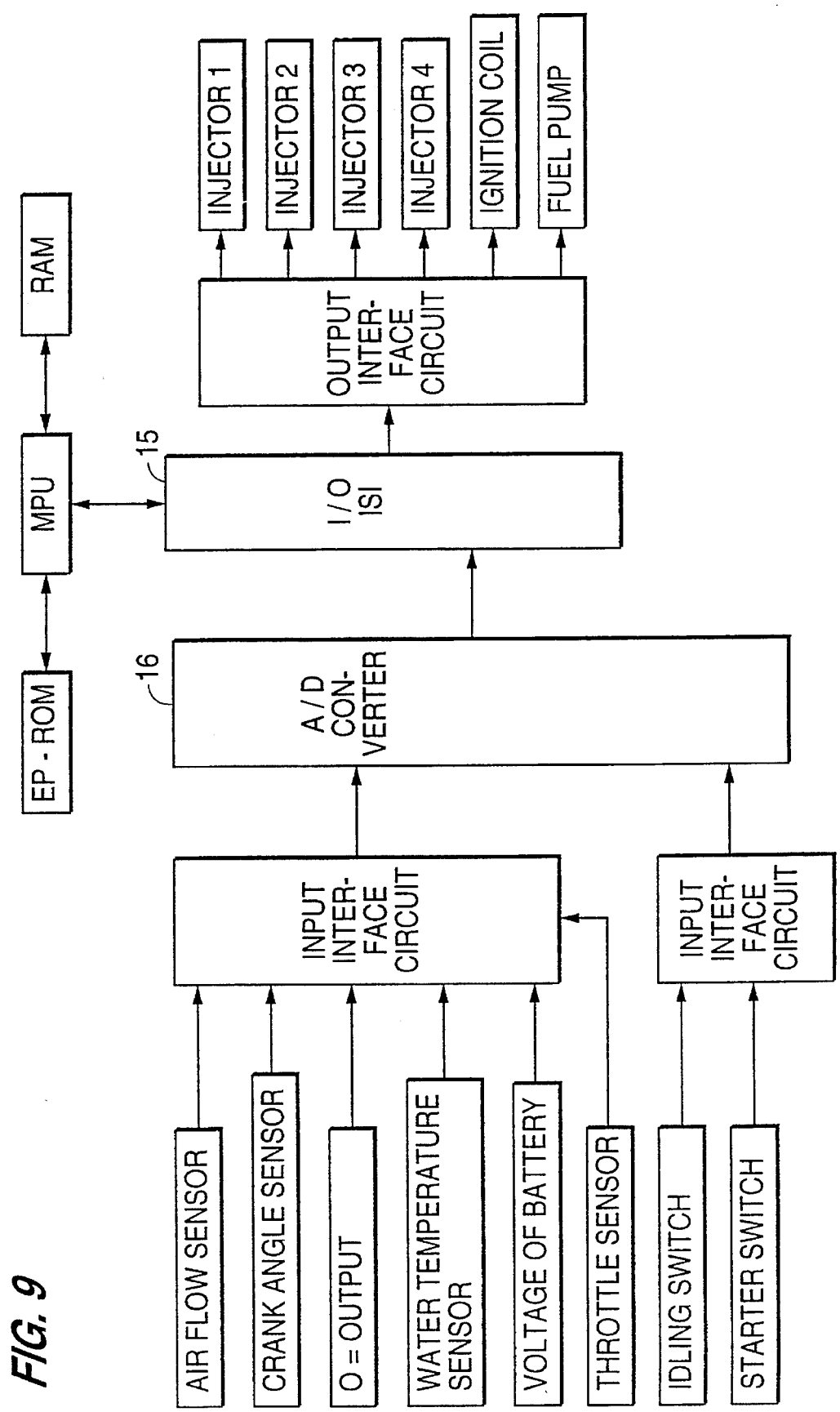
FIG. 9 is a block diagram of a control unit.

As shown in FIG. 9, the core of the control unit 15 receives signals from the micro processing unit MPU, the ROM, an A/D converter 16, and various sensors used to sense the engine's operation status. It executes required calculations, outputs control signals as the result of the calculations, and supplies required control signals to the fuel injector 13 and the ignition coil 17 (FIG. 6) to control the fuel supply amount and the ignition timing.

Figure 7:
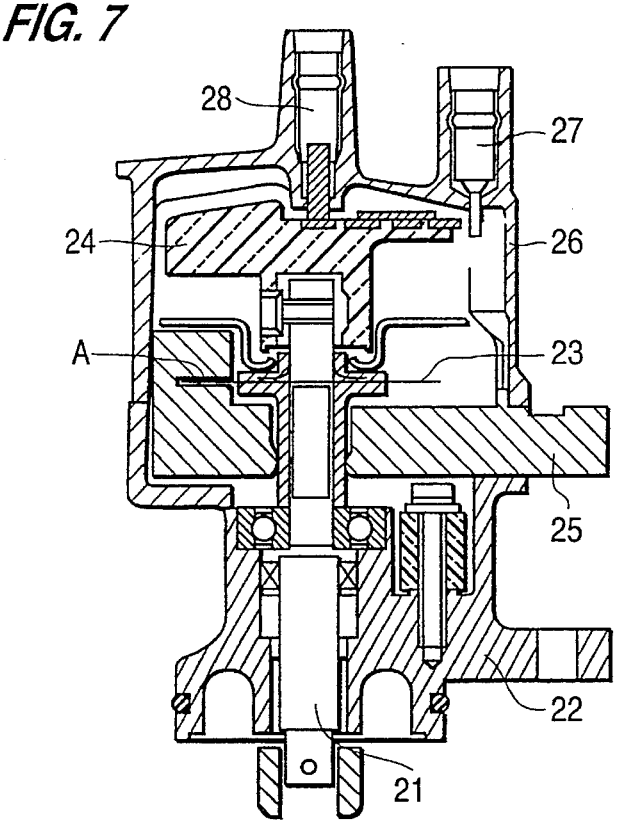
FIG. 7 is a cross section of a distributor which incorporates a crank angle sensor-that generates the REF signal.

FIG. 7 shows a cross section of the distributor, in which a crank angle sensor (disk 23 and signal detector 25) is used to generate the REF signal shown in FIG. 2. The shaft 21, which is freely rotatable in the housing 22, has a disk 23 fixed thereon, as well as the rotor head 24 used to distribute high pressure to each cylinder. The signal detector 25 is mounted so as to envelope a portion of the periphery of the disk 23. The plug socket 27 to which the power cables of ignition plugs are connected and a plug socket 28 to which a high voltage cable from the ignition coil 17 is connected are mounted in the cap 26. The ignition timing is controlled by signals sent from the ignition coil 17 (FIG. 6) to a power transistor.

Figure 8:
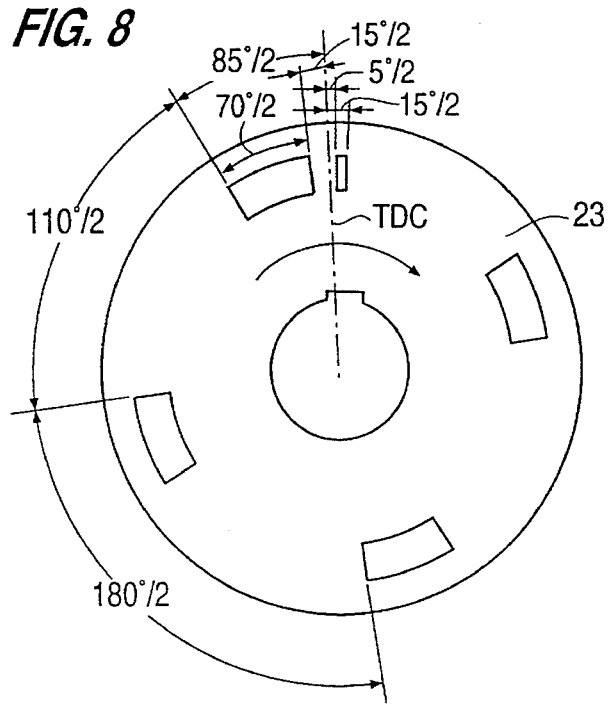
FIG. 8 shows a single plate or disk used in the crank angle sensor in FIG. 7.

FIG. 8 shows the shape of the disk 23, which has two types of slits. The REF signal shown in FIG. 2 is generated in a conventional manner when these slits pass the section A (FIG. 7) comprising a light emitter and a light receiver (not shown).

Next, ignition timing control as performed in the system configuration shown above will be explained below.

Figure 1:
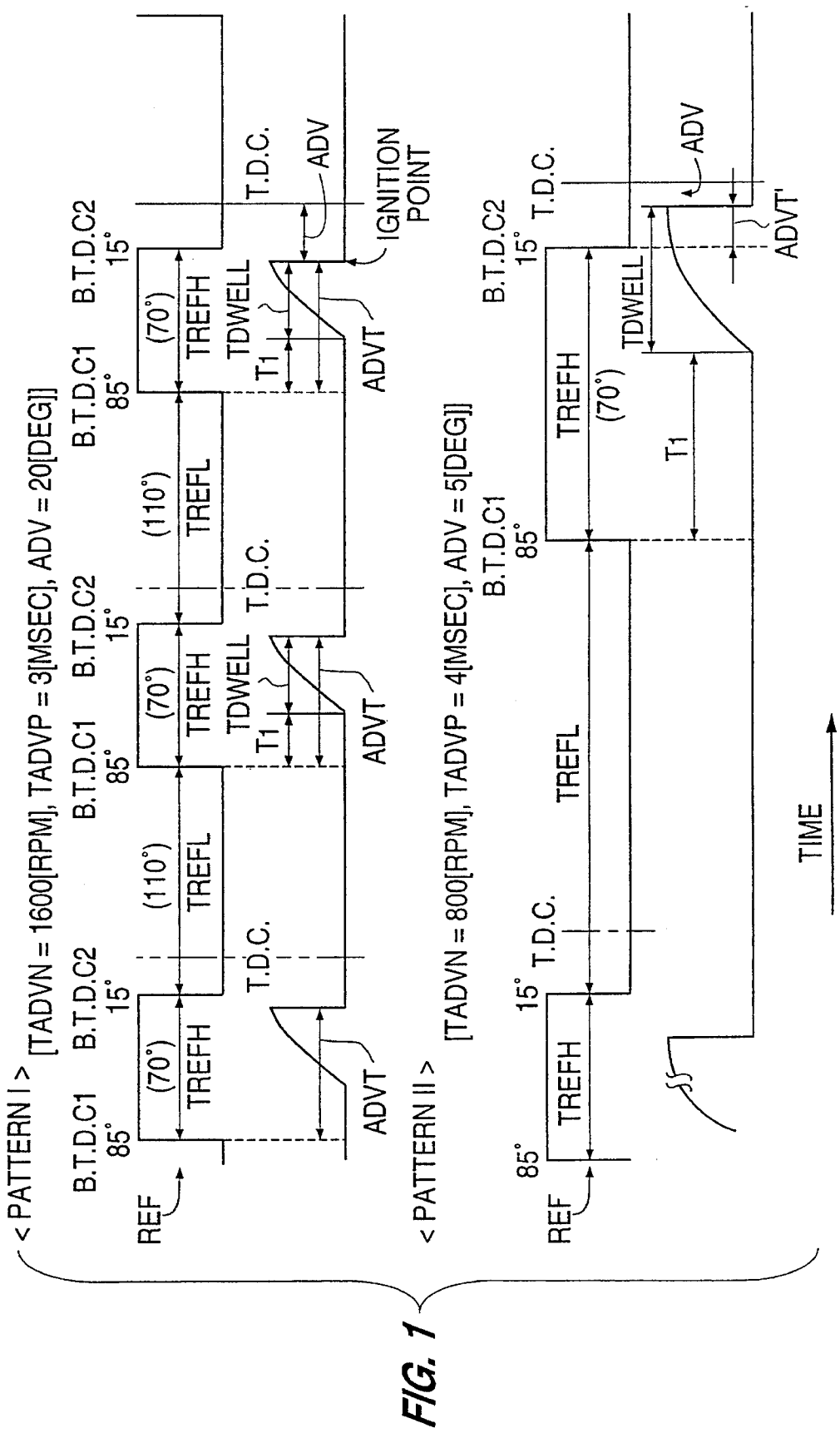
FIGS. 1–5 are timing diagrams which illustrate the setting of ignition timing.

FIG. 1 shows the timing of an embodiment of the invention, in which the REF signal defines the B.T.D.C. 85° leading signal and the B.T.D.C. 15° trailing signal for each cylinder. The basic ignition timing in such a system is set by accessing a look up table shown in FIG. 13 based on the basic pulse width TADVP and the engine speed TADVN. (The pulse width is proportional to the ratio of air flow and engine speed, and is determined by the formula.

$$TADVP = K_1 \frac{Qa}{Ne} \ .)$$

The ignition timing values ADV (angular spacing, in degrees, between TDC and the ignition point) contained in the look up table (stored in the ROM shown in FIG. 9) are optimized (with respect to engine output and controllability) for each operating condition. The cross hatched area in the FIG. 13 is an area in which the ignition point precedes B.T.D.C. 15° (that is, the advance value ADV is greater than 15°), and the non-hatched line area indicates an area in which the ignition point occurs after B.T.D.C. 15°. In FIG. 1, pattern I shows an example of the setting of ignition point for the hatched area, and pattern II is an example of setting the ignition point for the non-hatched area. In pattern I, ADVT is calculated and set with the expression 2 shown below, according to the first reference ignition point signal of B.T.D.C. 85°.

$$\begin{aligned} ADVT &= \frac{(CRSET - ADV)}{110°} \times TREFL(\text{msec}) \qquad \text{[Expression 2]} \\ &= \frac{(85° - 20°)}{110°} \times TREFL(\text{msec}) \end{aligned}$$

Where ADV is ignition timing value (in degrees) read from the look up table in FIG. 13 (in this case, assumed to be 20°) and CRSET is 85° (determined by spacing of apertures in disk 23). The value TREFL (in msec) is measured in a conventional manner by means of a clock. TREFL is used in this case to convert from degrees to msec simply because it is the most recently completed (and therefore most recently measured) time period.

In pattern II, ADVT is calculated and set with the expression 3 shown below, according to the second reference ignition point signal of B.T.D.C. 15°.

$$ADVT = \frac{(CRSET' - ADV)}{70°} \times TREFH(\text{msec}) \qquad \text{[Expression 3]}$$
$$= \frac{(15° - 10°)}{70°} \times TREFH(\text{msec})$$

In this case ADVT is measured from the reference point CRSET'+32 15°. Also, the period TREFH is used to convert from degrees to msec because in Pattern II (unlike pattern I) it is the most recently completed time period (that is, as between TREFH and TREFL). In this case the value of ADV, as determined from the look up table is assumed to be 10°; since this is less than 15°, the latter is used as the reference point.

It is also possible to calculate and set ADVT relative the first reference ignition point signal in the embodiment of this invention when the set ignition timing is 10°, as shown in the following expression:

$$ADVT = \frac{(CRSET - 70 - 10°)}{110°} \times TREFL \qquad \text{[Expression 4]}$$

When expression 4 above is used to calculate and set ADVT, the result is a little less accurate, although it is approximately the same as that of the pattern II.

As mentioned above, the reference for determining the ignition point (CRSET) is changed according to the basic ignition timing value (ADV), as determined from the basic ignition timing look up table. In practice, however, the basic ignition timing can be corrected with the cooling water temperature or when the fuel is stopped or according to the operating condition, and the final corrected ignition timing can be used to change the reference ignition point signal. TREFL and TREFH, however, are still calculated in proportion to the required time between points 85° and 15° as described in the conventional embodiments.

This invention will be explained in further detail below by reference to flow charts, which show its operation.

Figure 10:
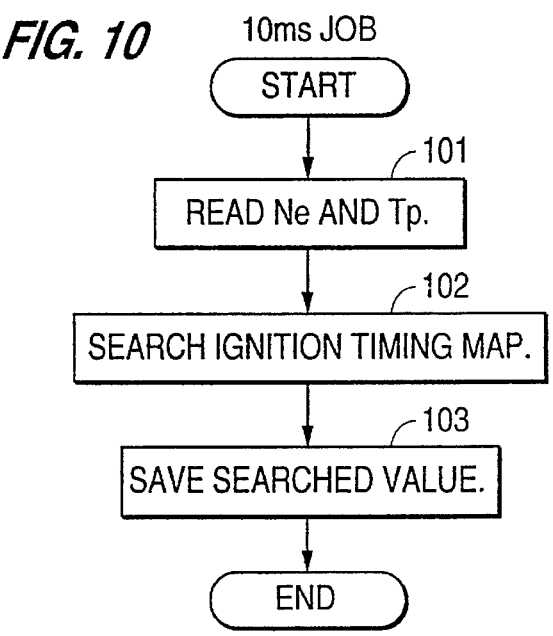
FIG. 10 is a flow chart which illustrates the process for setting an ignition timing.

FIG. 10 shows the method to determine ignition timing ADV. First, the engine speed $N_e$ and the fuel injection pulse width $T_p$ are read in step 101. ($T_p$ is determined from the air flow rate and engine speed:

$$Tp = K_2 \frac{Qa}{Ne} .)$$

The ignition timing ADV is then determined in step 102, from the ignition timing look up table, based on these values, and the read out value is saved in step 103.

Figure 11:
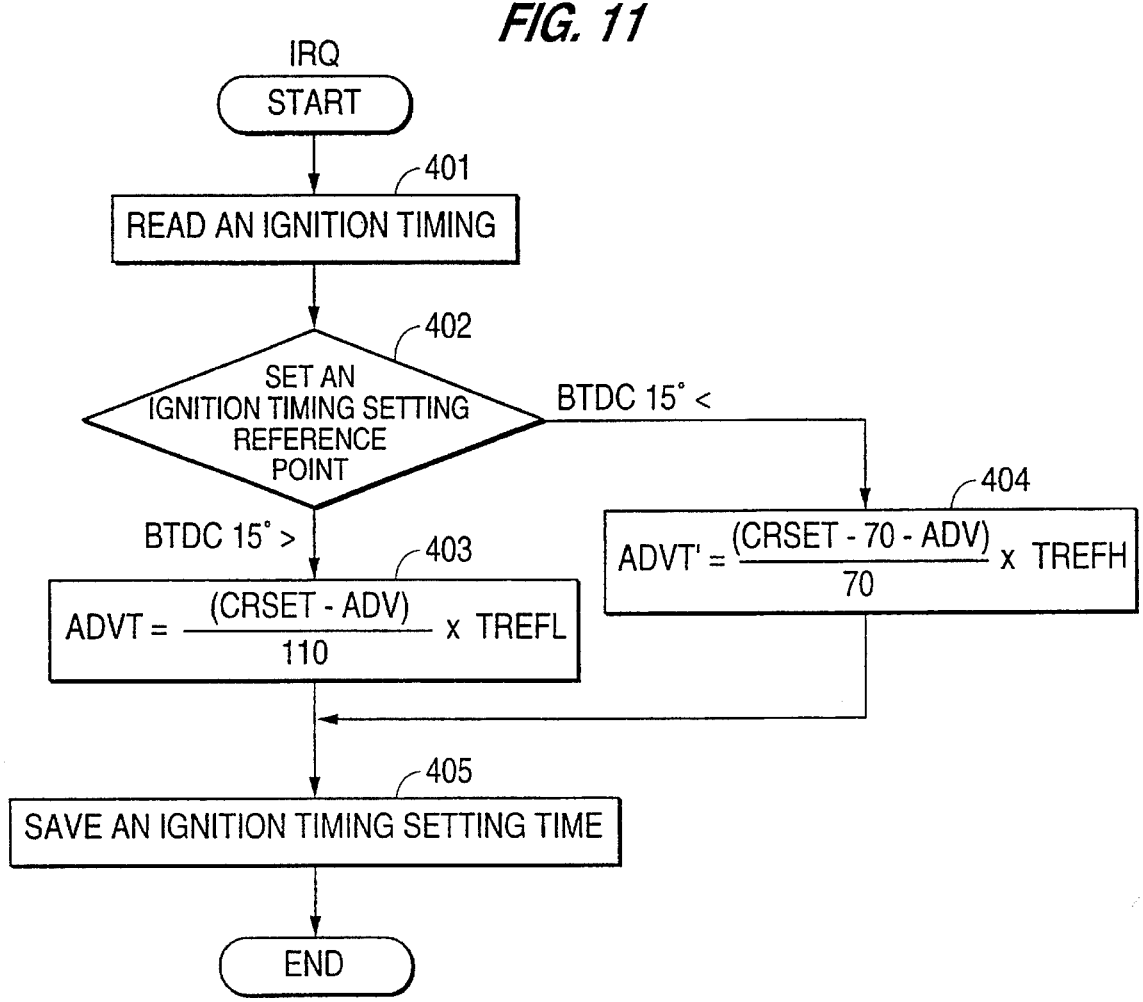
FIG. 11 is a flow chart which illustrates the operation of the control arrangement according to the invention.

FIG. 11 is a simplified flow chart which shows the calculation of the ignition timing according to the invention, in which either B.T.D.C. 85° or B.T.D.C. 15° is chosen for use as the reference point CRSET. The ignition timing value ADV determined in step 101 (FIG. 10) is read in step 401, and the ignition timing reference point CRSET is determined in step 402. That is, when ADV is larger than B.T.D.C. 15°, the processing goes to step 403, in which the time TREFL is read to determine the ignition timing setting time and calculate ADVT. When the value is smaller than B.T.D.C. 15°, the processing goes to step 404, where time TREFH is read to determine the ignition timing setting time and calculate ADVT. In step 405, the ignition timing setting time ADVT or ADVT calculated in step 403 or 404 is saved.

Figure 12A:
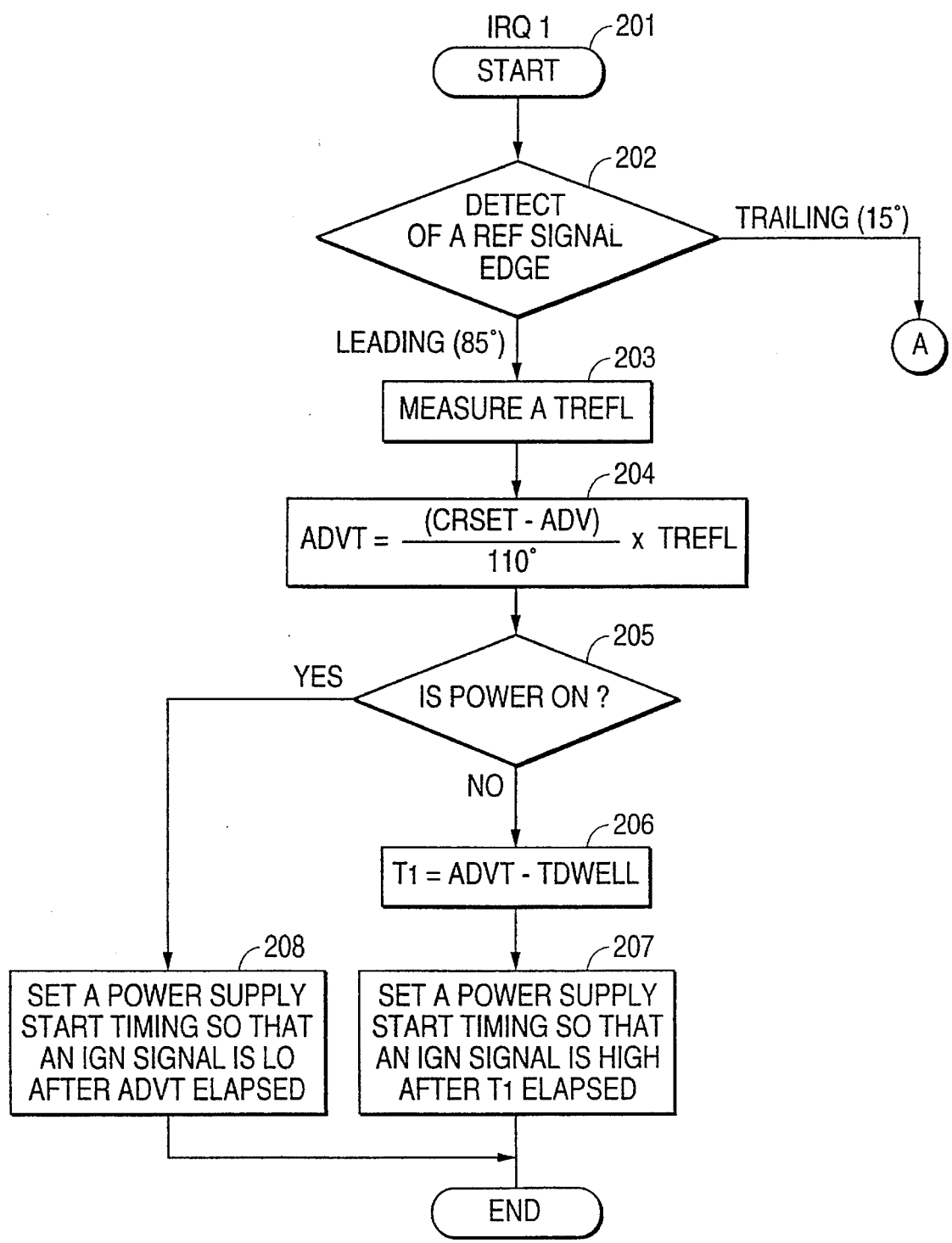
FIGS. 12A, 12B and 12C show a flow chart of the process for calculating the ignition timing setting time according to the invention.
Figure 12B:
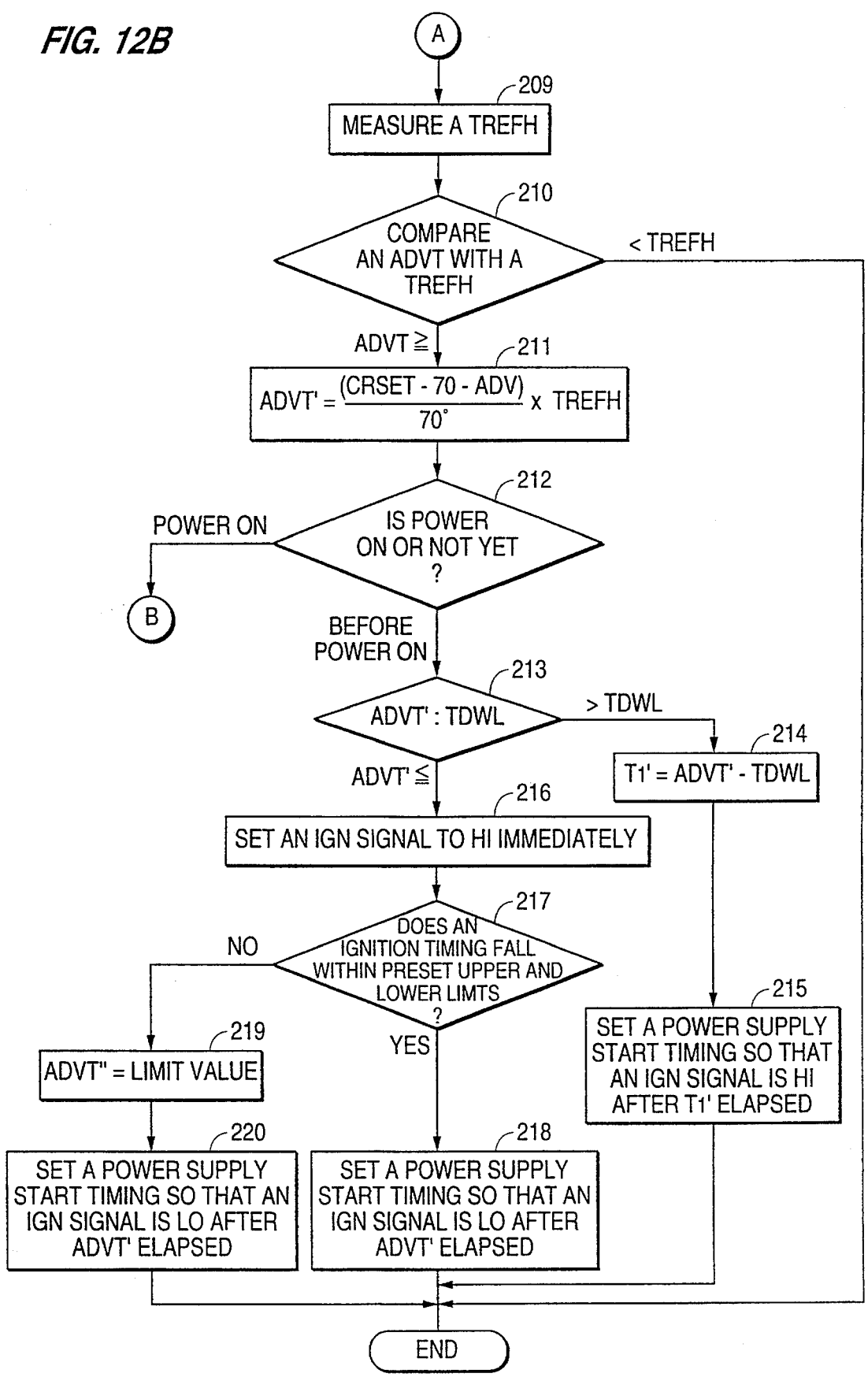
Figure 12C:
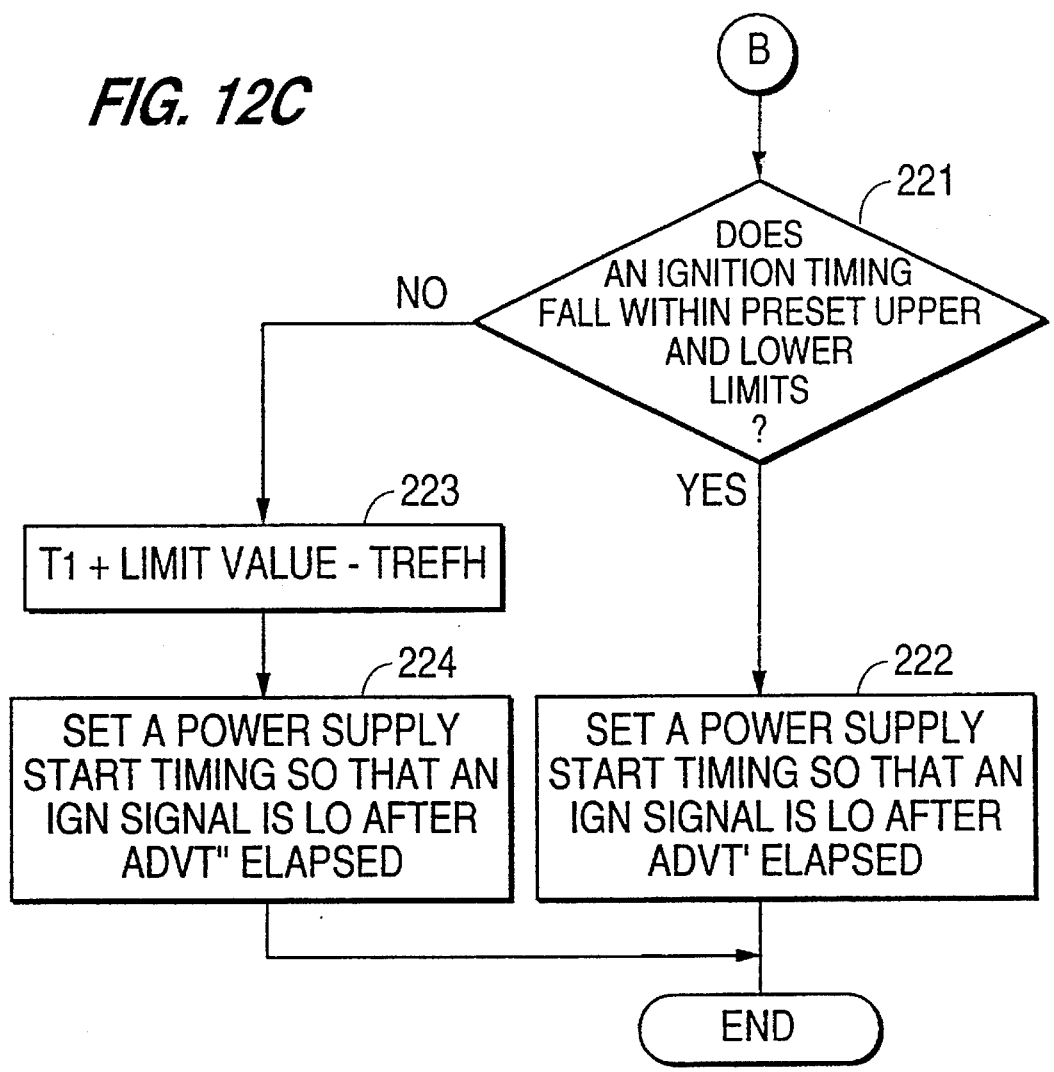

FIG. 12 shows the processing according to the invention in greater detail. According to the invention as noted previously, determination of the ignition point is based on the engine timing value ADV determined in FIG. 10. In the embodiment of FIG. 12, this is achieved by determining ignition timing twice for each ignition cycle of the cylinder in question: once at 85° point, and again at the 15° point. When the ignition point falls after the 15° point (ADV<15°) the timing determined as of the 15° is used in the place of that determined as of the 85° point.

In step 202 of FIG. 12A, it is determined whether the inquiry is being made at the leading edge of the REF signal (85°) or at the trailing edge (15°). If it is the leading edge (85°), TREFL-(msec) is read at step 203, and ADVT is calculated at step 204 according to Expression 2 as described above. At step 205 a determination is made whether the ignition power has previously been turned on, and if not, $T_1$ is calculated at step 206, and the system is set at step 207 so that ignition power is turned on at the end of $T_1$. If power has already been turned on at step 205, the system is set at step 206 so that the power is turned off at the end of ADVT.

This process is repeated at the 15° point (trailing edge), as shown in FIG. 12B. That is, the trailing edge is determined in step 202, and TREFH is then read at step 209. At step 210 a determination is made whether ADVT (determined previously at the 85° point is greater than TREFH. If it is not, then it follows that the ignition point precedes the 15° point (trailing edge), and the latter cannot therefore be used as a reference point to measure ignition timing for the current cycle. Accordingly, when ADVT is less than TREFH in step 210, processing is terminated and the timing determined at the 85° point is used.

If, however, ADVT is greater than TREFH in step 210, then the ignition point occurs after the trailing edge, which may then be used as a reference point for the determination of ignition timing. For this purpose, ADVT is calculated at step 211 according to Expression 3 (above), and if (at step 212) ignition power has not already been started from the previous determination of ignition timing, ADVT is compared with TDWL at step 213. (TDWL is the minimum period of time required to develop sufficient energy in the ignition coil to assure proper cylinder firing; it is thus a fixed engine parameter which depends on the characteristics of the engine.) If ADVT is greater than TDWL—that is, sufficient time is available between the reference point and the ignition point to develop the necessary ignition current—then processing proceeds to steps 214–215, which are analogous to steps 206–207, to establish and set $T_1$, which is then used for the current operating cycle in place of the timing determined previously at the 85° (leading edge) reference point.

If, however, ADVT is less than TDWL (in step 213), then insufficient time is available to develop the requisite ignition current, and a cylinder misfire is likely to result. In this case, the ignition current is started immediately at step 216, and (if the ignition timing falls within preset upper and lower limits in step 217) the system is set to turn ignition power off at the end of ADVT. (In other words, priority is given to assuring adequate time to develop sufficient current in the ignition coil to prevent a misfire; the spark is delayed long enough to permit the necessary ignition current to develop.)

If at step 212, ignition power has already been started (from the previous timing determination, at the 85° point), then processing goes to step 221 in which a further determination is made whether the ignition point falls within predetermined upper and lower limits. If so, the system is set at step 222 so that the ignition power is turned off at the end of ADVT. If the ignition point falls outside the predetermined limits, however, then the sum of $T_1$, plus the limit value, minus TREFH, is calculated at step 223; and the system is set at step 224 so that the ignition power is termination at the end of ADVT".

Finally, if at step 217 the ignition point falls outside the upper and lower limits, ADVT" is set equal to the limiting value and at step 220 the system is set so that ignition power is turned off at the end of ADVT".

The increased accuracy of the timing apparatus according to the present invention is achieved by limiting the time period between the reference point CRSET and the ignition point, thereby reducing the error generating effect of any increase or decrease in engine speed during this period. Instead of invariably using a single reference point CRSET (such as 85°) and the time period TREFL which immediately precedes it to calculate and fix the ignition point, the apparatus according to the invention uses either of two or more reference points—which are shown in the exemplary embodiment herein at 85° and 15°. When the period of time (ADVT) between the 85° reference point and the ignition point extends beyond the 15° point (that is, when ADV is less than 15°—see FIG. 1, for example), the reference point CRSET from which ignition timing ADVT is measured is switched to the 15° point, thereby reducing the elapsed time between the reference point CRSET and the ignition point. In this case, the most recently completed portion of the reference pulse cycle, TREFH, is used to make the conversion from degrees to msec.

Figure 15:
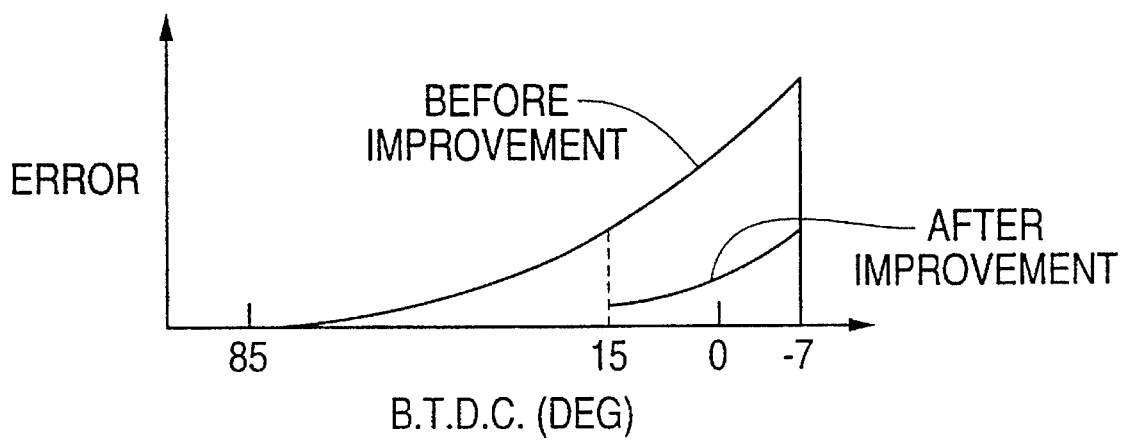
FIG. 15 illustrates the effects of the control arrangement according to the invention.
Figure 14:
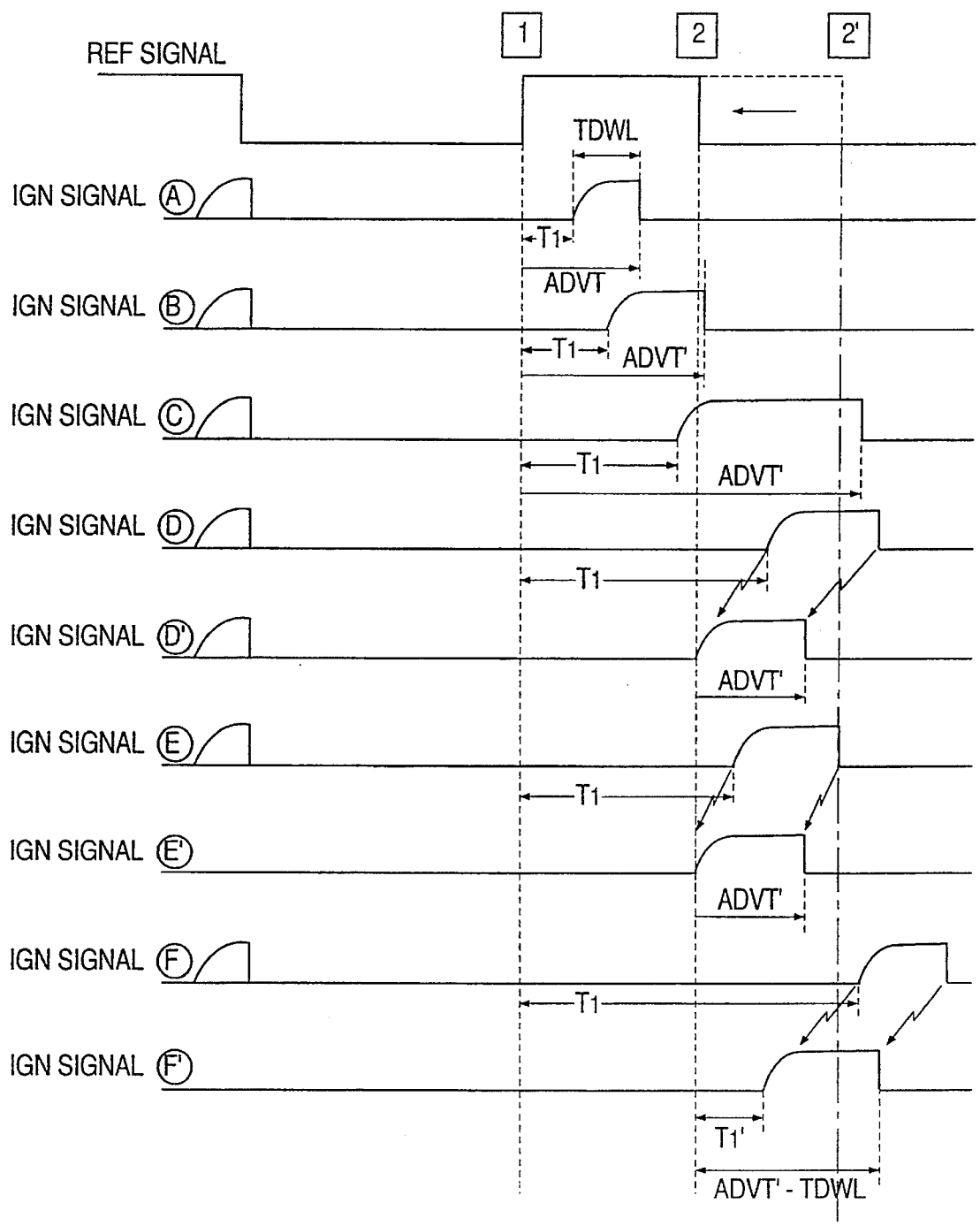
FIG. 14 is a timing diagram which shows the timing of ignition signals under various circumstances.

The effect of this improvement is illustrated in FIGS. 14 and 15. In FIG. 14 it can be seen that in each of waveforms D through F, wherein ADVT extends beyond the 15° point, the latter is used to determine ignition timing. The effect of this modification is shown in FIG. 15, in which the timing error (due to an assumed change of engine speed during ADVT) is reduced for values of ADVT which would otherwise extend beyond B.T.D.C. 15°.

The arrangement for controlling the ignition timing explained in the foregoing embodiment can also be used to control the fuel injection. In that case, the injection pulse trailing edge (injection ending point) is calculated on the basis of the leading edge of the reference pulse two pulses before the injection cylinder. The remaining time obtained by subtracting the fuel injection pulse width calculated according to the engine's operation status from the injection ending point indicates the injection starting point. The fuel injection is controlled using this starting point as the ignition timing.

As explained above, this invention can set two or more ignition timing measurement starting reference points before the top dead center corresponding to each cylinder and select the reference point most appropriate to the ignition timing, so that the difference between the value calculated in CPU and the actual ignition timing may be minimized when setting the ignition timing according to the said reference point. Thus, the required ignition timing can be obtained even when the engine speed changes. Fuel injection timing can also be controlled accurately by controlling the fuel injection.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. Method of controlling ignition timing of an internal combustion engine by means of an ignition timing control apparatus of the type wherein an ignition spark advance angle is determined based on engine operating parameters, and is used to calculate an ignition time, which is measured from a cylinder reference point for each cylinder, to establish an ignition point for each such cylinder, said method comprising the steps of:

providing a reference signal having a plurality of alternative reference points for each cylinder;

determining said ignition spark advance angle based on angular speed of said engine a quantity of air flow thereto;

comparing said ignition spark advance angle with said plurality of alternative reference points; and for each firing cycle of each cylinder, selecting one of said alternative reference points which most closely precedes said ignition spark advance angle, for use as the reference point for said firing cycle.

2. Method according to claim 1, wherein said reference signal has for each cylinder at least one pulse having leading and trailing edges which occur at predetermined angular points in said firing cycle of said cylinder.

3. Method according to claim 2, wherein said alternative reference points comprise said leading and trailing edges of said reference signal pulse.

4. Method of controlling ignition timing of an internal combustion engine comprising, for each cylinder of said engine, the steps of:

generating a reference signal having a plurality of designated reference points which occur at predetermined angular points in an operating cycle of said cylinder;

determining an ignition spark advance angle for said cylinder based on operating parameters of said engine;

comparing said ignition spark advance angle with said plurality of designated reference points;

selecting one of said reference points which most closely precedes said ignition spark advance angle;

calculating an ignition timing value relative to said selected reference point based on said ignition spark advance angle;

measuring said calculated ignition timing value from said selected reference point; and generating an ignition spark at end of said measured ignition timing value.

5. Method according to claim 4, wherein said step of determining an ignition spark advance angle comprises:

detecting engine speed of said engine;

determining an ignition spark pulse width based on said engine speed and on a quantity of input air flow to said engine;

reading said ignition spark advance angle from a look up table, based on said engine speed and said pulse width.

6. Method according to claim 4, wherein:

said reference signal comprises a series of pulses, with at least one such pulse for each cylinder; and said plurality of designated reference points comprise leading and trailing edges of said at least one pulse.

7. Method according to claim 6, wherein said leading and trailing edges occur at about 85° and 15° respectively before a top of dead center position of said cylinder operating cycle.

8. Method according to claim 6, wherein said step of selecting one of said reference points comprises:

comparing said advance angle with angular position of said trailing edge of said at least one pulse;

if said advance angle is greater than said angular position of said trailing edge, selecting said leading edge of said at least one pulse; and if said advance angle is smaller than said angular position of said trailing edge, selecting said trailing edge of said at least one pulse.

9. Method according to claim 8, wherein said step of calculating an ignition timing value comprises multiplying a difference between angular position of a selected reference point and said advance angle, by a ratio of time duration and angular magnitude of a selected portion of said reference signal.

10. Method according to claim 9, wherein said selected portion of said reference signal comprises:

that most recently completed portion of said reference signal between a trailing edge thereof and a next successive leading edge thereof when said leading edge is selected; and that most recently completed portion of said reference signal between a leading edge thereof and a next successive trailing edge thereof when said trailing edge is selected.

11. Method according to claim 4, comprising the additional steps:

comparing said ignition timing value with a predetermined minimum time period necessary to accumulate sufficient ignition current to assure generation of an adequate ignition spark; and when said ignition timing value is less than said minimum, starting said ignition current immediately, and setting said ignition timing value equal to said minimum time period, whereby an adequate ignition current is assured.

12. Method according to claim 5, comprising the additional steps:

comparing said ignition timing value with a predetermined minimum time period necessary to accumulate sufficient ignition current to assure generation of an adequate ignition spark; and when said ignition timing value is less than said minimum, starting said ignition current immediately, and setting said ignition timing value equal to said minimum time period, whereby an adequate ignition current is assured.

13. Method according to claim 8, comprising the additional steps:

comparing said ignition timing value with a predetermined minimum time period necessary to accumulate sufficient ignition current to assure generation of an adequate ignition spark; and when said ignition timing value is less than said minimum, starting said ignition current immediately, and setting said ignition timing value equal to said minimum time period, whereby an adequate ignition current is assured.

14. Apparatus for controlling ignition timing of an internal combustion engine, said apparatus comprising:

a reference signal generator which provides a reference signal having a plurality of designated reference points which occur at predetermined angular points relative to an operating cycle of each cylinder of said internal combustion engine;

a memory containing a look up table of ignition spark advance angle values;

means for reading an ignition spark advance angle value from said look up table;

means for selecting one of said reference points which most closely precedes said advance angle;

means for calculating an ignition timing value relative to said selected reference point, based on said ignition spark advance angle;

means for measuring said calculated ignition timing value from said selected reference point; and means for generating an ignition spark at end of said measured ignition timing value.

15. Apparatus according to claim 14, wherein:

said reference signal comprises a series of pulses, with at least one such pulse for each cylinder; and said plurality of designated reference points comprise leading and trailing edges of said at least one pulse.

16. Apparatus according to claim 15, wherein said leading and trailing edges occur at about 85° and 15° respectively before a top of dead center position of said cylinder operating cycle.

17. Apparatus according to claim 16, wherein said means for selecting one of said reference points comprises:

means for comparing said advance angle with angular position of said trailing edge, and for selecting said leading edge if said advance angle is greater than magnitude of said angular position of said trailing edge, and for selecting said trailing edge if said advance angle is smaller than magnitude of said angular position of said trailing edge.

18. Apparatus according to claim 14, wherein said reference signal generator comprises:

a shaft coupled to rotate in fixed angular relationship to a cranking angle of said internal combustion engine;

a disc mounted on said shaft and having apertures therein; said apertures being located at predetermined angular locations on said disc, which locations bear a fixed relationship to said cranking angle of said engine;

a detector situated adjacent said disc for detecting said aperture in said disc.

19. Apparatus according to claim 18, wherein said detector comprises a light source and a photosensitive element coupled to receive light from said light source when said aperture is adjacent said detector.

20. Apparatus according to claim 19, wherein a leading edge of said aperture generates a leading edge of an output pulse of said reference signal, and said trailing edge generates a trailing edge of said output pulse.

* * * * *